(12) United States Patent
Li (10) Patent No.: US 10,255,541 B2
(45) Date of Patent: Apr. 9, 2019

(54) VEHICLE RFID TAG

(71) Applicant: XIAMEN INNOV INFORMATION SCIENCE & TECHNOLOGY CO. LTD., Fujian (CN)

(72) Inventor: Wenzhong Li, Fujian (CN)

(73) Assignee: XIAMEN INNOV INFORMATION SCIENCE & TECHNOLOGY CO. LTD., Fujian (CN)

( * ) Notice: Subject to any disclaimer, the term of this patent is extended or adjusted under 35 U.S.C. 154(b) by 0 days.

(21) Appl. No.: 15/371,845

(22) Filed: Dec. 7, 2016

(65) Prior Publication Data
US 2018/0107911 A1    Apr. 19, 2018

(30) Foreign Application Priority Data
Oct. 18, 2016 (CN) ................. 2016 2 1132476 U (51) Int. Cl.
G06K 19/077    (2006.01)

(52) U.S. Cl.
CPC . *G06K 19/07728* (2013.01); *G06K 19/07758* (2013.01)

(58) Field of Classification Search
USPC ........................................... 235/492
See application file for complete search history.

(56) References Cited

U.S. PATENT DOCUMENTS

| 8,228,193 B1* | 7/2012 | Tumer | G06K 19/0723 340/10.34 |
| 2002/0190132 A1* | 12/2002 | Kayanakis | G06K 19/07749 235/492 |
| 2006/0118229 A1* | 6/2006 | Ohashi | G06K 19/077 156/60 |

* cited by examiner

*Primary Examiner* — Rafferty D Kelly
(74) *Attorney, Agent, or Firm* — Stein IP, LLC (57) ABSTRACT

The utility model discloses a vehicle RFID tag comprising a first glue layer, IR/UV protective layers, an INLAY layer, a second glue layer and a print layer, and the first glue layer, the INLAY layer, the second glue layer and the print layer are sequentially arranged in a stacked mode; the INLAY layer comprises a fragile layer, an RFID antenna layer and an RFID chip, and the fragile layer, the RFID antenna layer and the RFID chip are sequentially arranged in a stacked mode; the areas of the IR/UV protective layers are larger than the area of the RFID chip, and the viscosity of the first glue layer is larger than that of the second glue layer. The utility model has the beneficial effects that the anti-dismantling function is achieved, and the RFID chip can be protected against damage caused by ultraviolet rays and infrared rays.

11 Claims, 10 Drawing Sheets

VEHICLE RFID TAG

INCORPORATION BY REFERENCE

This application is based upon and claims the benefit of priority from the corresponding Chinese Patent Application No. 201621132476.1 filed on Oct. 18, 2016, the entire contents of which are incorporated herein by reference.

TECHNICAL FIELD

The utility model relates to the technical field of RFID tags, in particular to a vehicle RFID tag.

DESCRIPTION OF RELATED ART

At present, for learning about various kinds of vehicle information, the annual inspection information and other vehicle information is generally printed on paper labels printed with characters and patterns, and the paper labels are attached to windshields of the vehicles to be recognized by workers with naked eyes. Since paper print can be copied extremely easily and cannot be recognized rapidly and effectively, circulation of counterfeit labels is connived to a great extent, and serious harm to society is caused.

With the continuous development and progress of society, vehicle information, annual inspection information and other vehicle information is generally stored in electronic tags at present, and the information in the electronic tags is read through readers so that the behaviors of counterfeit information can be prevented. However, the anti-dismantling performance of traditional RFID tags is poor, the damage degree is not high enough when the traditional RFID tags are dismantled, and therefore the behaviors of counterfeit information still cannot be completely eradicated. Although an anti-dismantling electronic tag based on a ceramic substrate is developed at present, the anti-dismantling purpose of the electronic tag is realized in a way that an antenna layer is damaged by breaking off the ceramic substrate through stress, and thus an RFID chip cannot be read or recognized; the cost of the existing ceramic tag is high, and since the ceramic tag is a hard tag, when a windshield of a vehicle is impacted and broken, the broken ceramic tag is provided with sharp corners, and severe injuries to passengers in the vehicle are probably caused. In addition, after the RFID tag is stuck to the windshield, ultraviolet rays and infrared rays of sunlight directly irradiate the RFID tag, the chip in the RFID tag can be damaged after long-term use, and consequentially the RFID tag is damaged.

BRIEF SUMMARY OF THE UTILITY MODEL

For solving the technical problems, the utility model provides a vehicle RFID tag which is good in anti-dismantling performance and can protect a chip against the damage caused by ultraviolet rays and infrared rays.

According to the technical scheme adopted by the utility model for solving the technical problems:

A vehicle RFID tag comprises a first glue layer, IR/UV protective layers, an INLAY layer, a second glue layer and a print layer; and the first glue layer, the INLAY layer, the second glue layer and the print layer are sequentially in a stacked mode; the INLAY layer comprises a fragile layer, an RFID antenna layer and an RFID chip, and the fragile layer, the RFID antenna layer and the RFID chip are sequentially arranged in a stacked mode; the IR/UV protective layers are arranged on the side, facing the first glue layer, of the INLAY layer or on the two sides, facing the first glue layer and the second glue layer, of the INLAY layer; the arrangement positions of the IR/UV protective layers are matched with the position of the RFID chip in the INLAY layer; the areas of the IR/UV protective layers are larger than the area of the RFID chip; the viscosity of the first glue layer is larger than that of the second glue layer.

Furthermore, the first glue layer, the IR/UV protective layers, the RFID chip, the RFID antenna layer, the fragile layer and the second glue layer are sequentially arranged in a stacked mode.

Furthermore, the first glue layer, the IR/UV protective layers, the fragile layer, the RFID antenna layer, the RFID chip and the second glue layer are sequentially arranged in a stacked mode.

Furthermore, the vehicle RFID tag comprises an isolating layer, and the isolating layer is provided with a hollowed-out area and arranged on the side, away from the INLAY layer, of the first glue layer; the side, away from the first glue layer, of the isolating layer is coated with mucilage glue; the viscosity of the mucilage glue is smaller than that of the first glue layer; the arrangement position of the hollowed-out area is matched with the position of the RFID chip in the INLAY layer.

Furthermore, the vehicle RFID tag comprises a protection layer, and the protection layer is arranged on the side, away from the second glue layer, of the print layer.

Furthermore, the protection layer is made of PET or PE or PP.

Furthermore, the vehicle RFID tag comprises a release film layer, and the release film layer is arranged on the side, away from the IR/UV protective layers, of the first glue layer.

Furthermore, the print layer is made of coated paper or PP or PET.

Furthermore, the INLAY layer further comprises a conductive glue layer, and the conductive glue layer is arranged between the RFID chip and the RFID antenna layer.

Furthermore, chip information of the RFID chip is printed on the fragile layer.

The utility model has the beneficial effects that when the tag is in use, the tag is stuck to the inner side of a front windshield of a vehicle or the outer side of a lamp shade of a vehicle lamp; the arrangement positions of the IR/UV protective layers are matched with the position of the RFID chip in the INLAY layer, so that infrared rays and ultraviolet rays emitted by sunlight and the vehicle lamp are prevented, and accordingly the RFID chip can be protected against damage caused by infrared rays and ultraviolet rays; the viscosity of the first glue layer is larger than that of the second glue layer, and the viscosity of the first glue layer is larger, so that the effect that the INLAY layer is firmly stuck on the windshield or the lamp shade is guaranteed, and deformation and fragmentation of a fragile film are caused when the tag is torn with external force, so that the structure of the RFID layer and connection with the RFID chip of the RFID layer are destroyed, a circuit of the RFID tag is damaged, and accordingly the anti-dismantling effect is achieved; low-viscosity glue or micro-viscosity glue is generally adopted by the second glue layer, and the print layer can be separated from the tag quite easily when the tag is torn with external force, so that the integrity of the tag is destroyed, and a certain anti-counterfeit effect is achieved.

DESCRIPTION OF THE MARK NUMBERS 1, first glue layer; 2, IR/UV protective layer; 3, INLAY layer; 31, fragile layer; 32, RFID antenna layer; 33, RFID chip; 4, second glue layer; 5, print layer; 6, isolating layer; 61, hollowed-out layer; 611, hollowed-out area edge; 7, protection layer; 8, release film layer.

DETAILED DESCRIPTION OF THE UTILITY MODEL

The key conception of the utility model lies in that a fragile layer and IR/UV protective layers are arranged, and the viscosity of a first glue layer is larger than that of a second glue layer, so that a tag is made to have an anti-dismantling function and an infrared ray and ultraviolet ray preventing function.

Figure 1A:
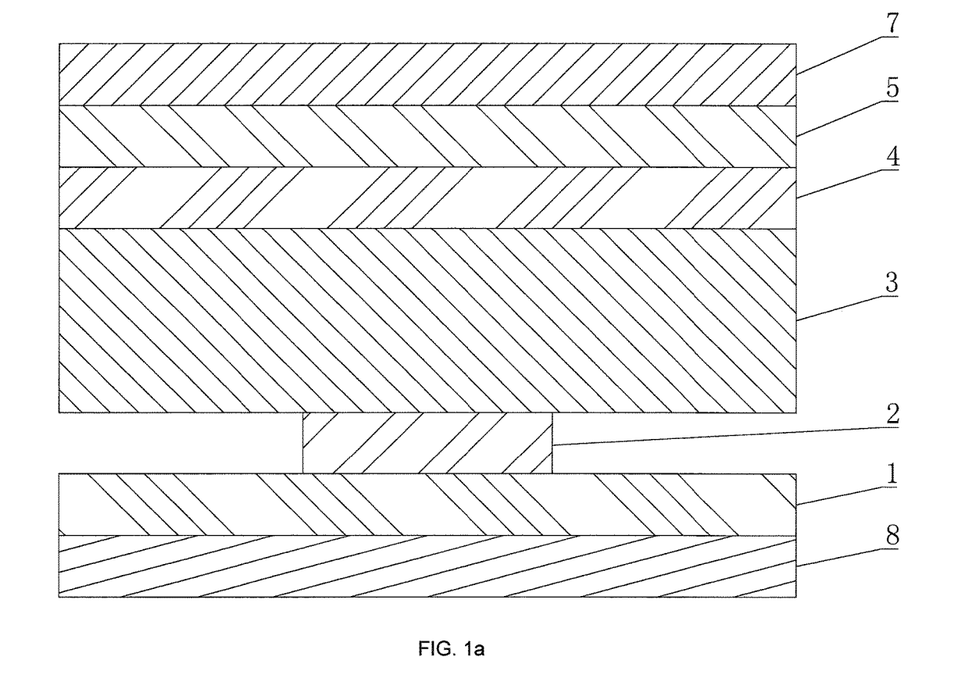
FIG. 1a is a sectional view of the hierarchical structure of a vehicle RFID tag of a first embodiment of the utility model.
Figure 1B:
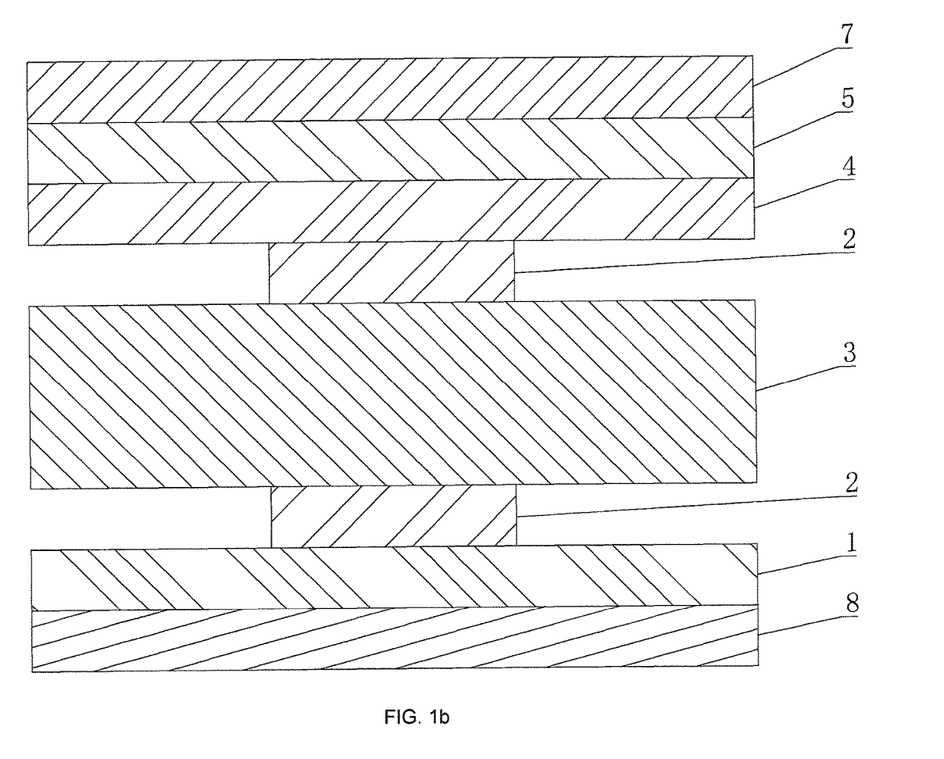
FIG. 1b is a sectional view of the hierarchical structure of a vehicle RFID tag of a second embodiment of the utility model.

Please see FIG. 1a and FIG. 1b, a vehicle RFID tag comprises a first glue layer 1, IR/UV protective layers 2, an INLAY layer 3, a second glue layer 4 and a print layer 5; the first glue layer 1, the INLAY layer 3, the second glue layer 4 and the print layer 5 are sequentially arranged in a stacked mode; the INLAY layer 3 comprises a fragile layer 31, an RFID antenna layer 32 and an RFID chip 33, and the fragile layer 31, the RFID antenna layer 32 and the RFID chip 33 are sequentially arranged in a stacked mode; the IR/UV protective layers 2 are arranged on the side, facing the first glue layer 1, of the INLAY layer 3 or on the two sides, facing the first glue layer 1 and the second glue layer 4, of the INLAY layer 3; the arrangement positions of the IR/UV protective layers 2 are matched with the position of the RFID chip 33 in the INLAY layer 3; the areas of the IR/UV protective layers 2 are larger than the area of the RFID chip 33; the viscosity of the first glue layer 1 is larger than that of the second glue layer 4.

It can be known from the above description that the utility model has the beneficial effects that when the tag is in use, the tag is stuck to the inner side of a front windshield of a vehicle or the outer side of a lamp shade of a vehicle lamp through the first glue layer; the arrangement positions of the IR/UV protective layers are matched with the position of the RFID chip in the INLAY layer, so that infrared rays and ultraviolet rays emitted by sunlight and the vehicle lamp are prevented, and accordingly the RFID chip can be protected against damage caused by infrared rays and ultraviolet rays; the viscosity of the first glue layer is larger than that of the second glue layer, and the viscosity of the first glue layer is larger, so that the effect that the INLAY layer is firmly stuck on the windshield or the lamp shade is guaranteed, and deformation and fragmentation of a fragile film are caused when the tag is torn with external force, so that the structure of the RFID layer and connection with the RFID chip of the RFID layer are destroyed, a circuit of the RFID tag is damaged, and accordingly the anti-dismantling effect is achieved; low-viscosity glue or micro-viscosity glue is generally adopted by the second glue layer, and the print layer can be separated from the tag quite easily when the tag is torn with external force, so that the integrity of the tag is destroyed, and a certain anti-counterfeit effect is achieved.

In the first embodiment shown in FIG. 1a, one IR/UV protective layer 2 is arranged on the side, facing the first glue layer 1, of the INLAY layer 3, the tag in the embodiment is used for being stuck on the inner side of the front windshield of the vehicle, and the IR/UV protective layer 2 can protect the RFID chip 33 against damage caused by infrared rays and ultraviolet rays, irradiating into the tag from the outer side of the front windshield, in sunlight.

In the second embodiment shown in FIG. 1b, the IR/UV protective layers 2 are arranged on the two sides, facing the first glue layer 1 and the second glue layer 4, of the INLAY layer 3 correspondingly, the tag in the embodiment is used for being stuck to the outer side of a lamp shade of a headlamp of the vehicle, and the IR/UV protective layers 2 can protect the RFID chip 33 against damage caused by infrared rays and ultraviolet rays, irradiating into the tag from the outer side of the headlamp, in sunlight and damage caused by infrared rays and ultraviolet rays in light of the vehicle lamp.

Figure 2A:
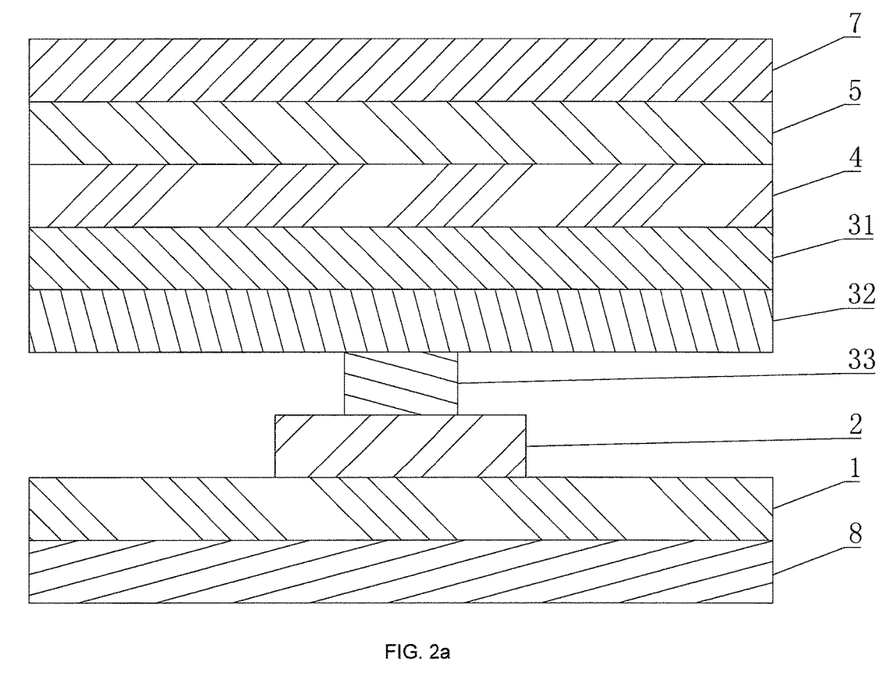
FIG. 2a is a sectional view of the hierarchical structure of a vehicle RFID tag of a third embodiment of the utility model.

Furthermore, in the third embodiment shown in FIG. 2a, the first glue layer 1, the IR/UV protective layers 2, the RFID chip 33, the RFID antenna layer 32, the fragile layer 31 and the second glue layer 4 are sequentially arranged in a stacked mode.

Figure 2B:
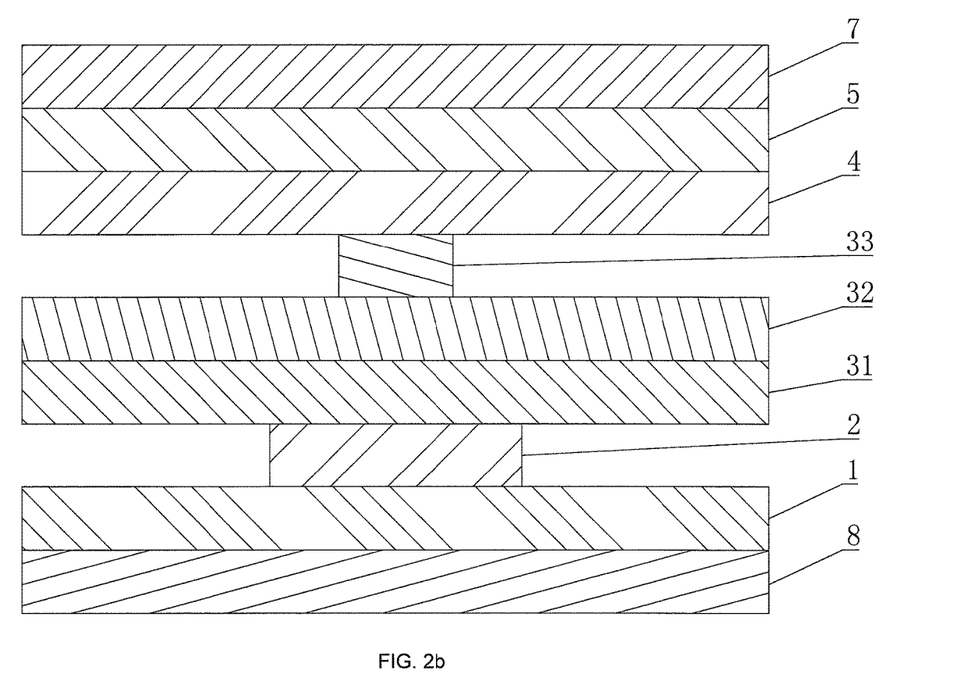
FIG. 2b is a sectional view of the hierarchical structure of a vehicle RFID tag of a fourth embodiment of the utility model.

Furthermore, in the fourth embodiment shown in FIG. 2b, the first glue layer 1, the IR/UV protective layers 2, the fragile layer 31, the RFID antenna layer 32, the RFID chip 33 and the second glue layer 4 are sequentially arranged in a stacked mode.

It can be known from the above description, two different detailed schemes of the structure of the INLAY layer are provided in the third embodiment and the fourth embodiment correspondingly; the RFID chip faces the windshield side of the vehicle in the third embodiment, and the RFID chip is away from the windshield side of the vehicle in the fourth embodiment; in both schemes, the IR/UV protective layers can well isolate a radiation source of ultraviolet rays and infrared rays from the RFID chip, and the purpose of protecting the RFID chip against damage caused by ultraviolet rays and infrared rays is realized. Specifically, in the third embodiment, since IR/UV protective paint can be directly sprayed onto the RFID chip to form the IR/UV protective layers, processing is easier; in the fourth embodiment, since the fragile layer and the antenna layer are additionally arranged between the IR/UV protective layers and the RFID chip, the ultraviolet ray and infrared ray preventing effect is better.

Figure 4A:
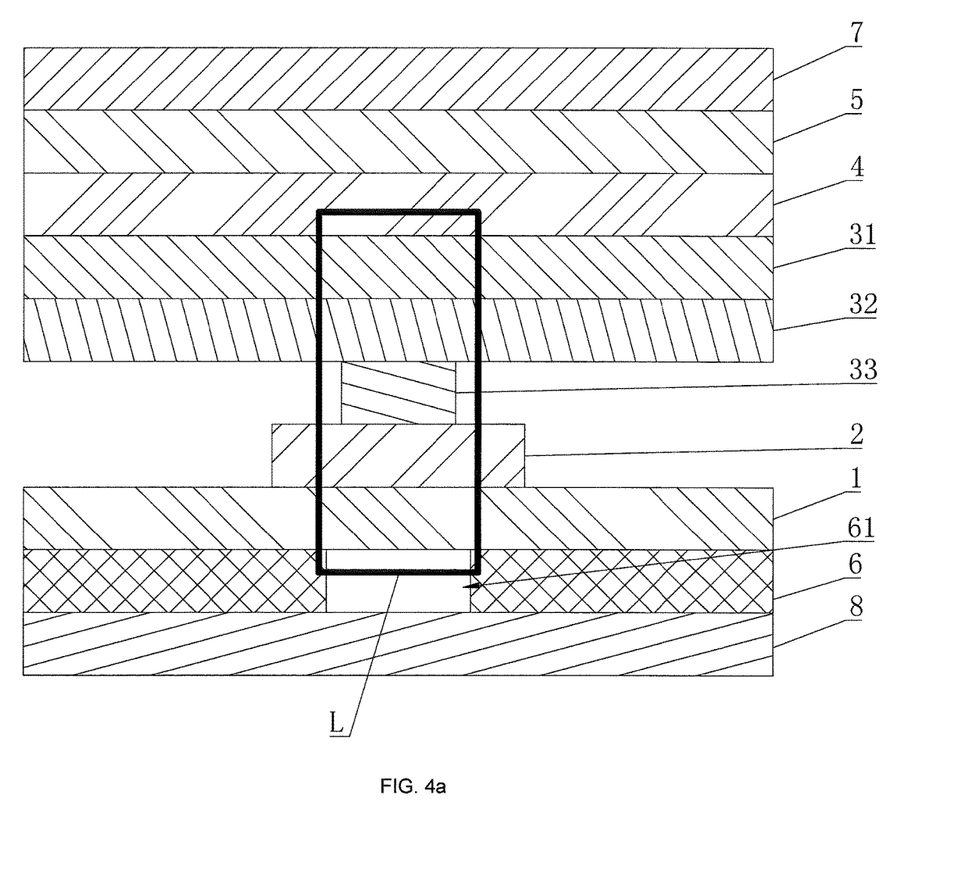
FIG. 4a is a sectional view of the hierarchical structure of a vehicle RFID tag of a fifth embodiment of the utility model.
Figure 4B:
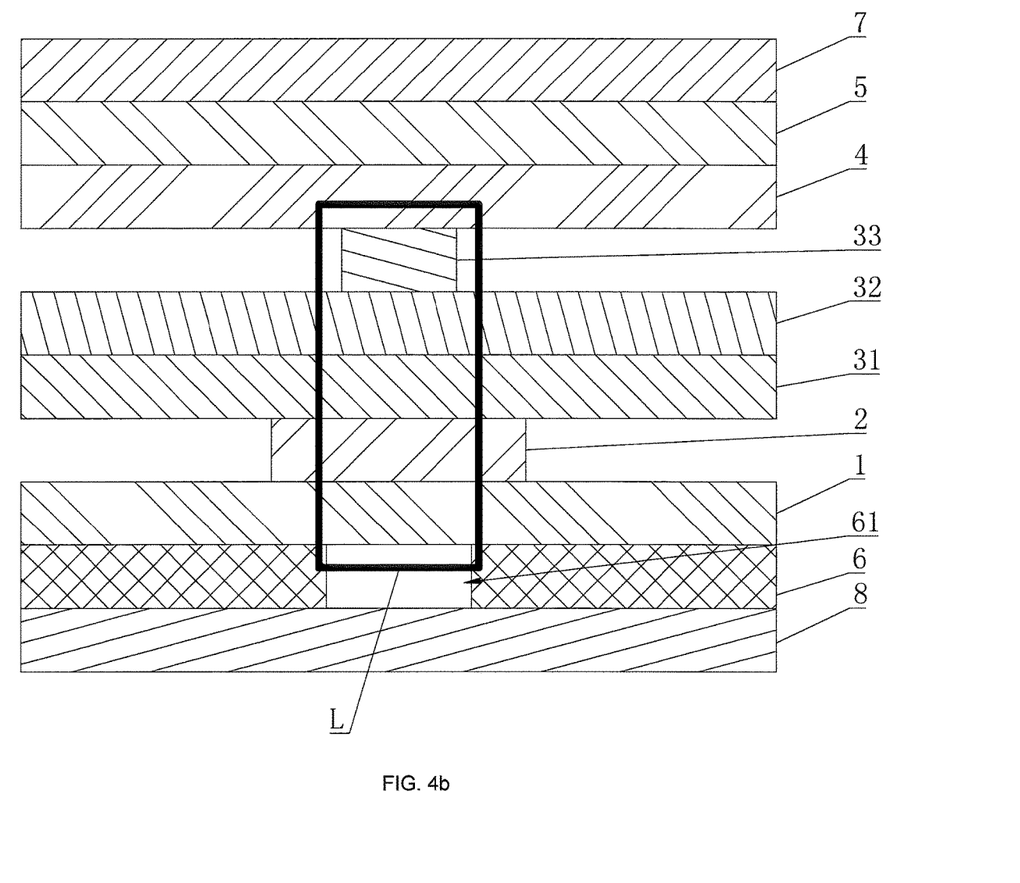
FIG. 4b is a sectional view of the hierarchical structure of a vehicle RFID tag of a sixth embodiment of the utility model.

Furthermore, as is shown in FIG. 4a and FIG. 4b, the vehicle RFID tag further comprises an isolating layer 6, and the isolating layer 6 is provided with a hollowed-out area 61 and arranged on the side, away from the INLAY layer 3, of the first glue layer 1; the side, away from the first glue layer 1, of the isolating layer 6 is coated with mucilage glue; the viscosity of the mucilage glue is smaller than that of the first glue layer 1; the arrangement position of the hollowed-out area 61 is matched with the position of the RFID chip 33 in the INLAY layer 3.

It can be known from the above description that the isolating layer provided with the hollowed-out area is arranged outside the first glue layer, so that after the tag is stuck to the inner side of the windshield, only the portion, located outside the hollowed-out area, of the first glue layer is stuck to the windshield through the hollowed-out area; since the arrangement position of the hollowed-out area is matched with the position of the RFID chip in the INLAY layer, the RFID chip is also firmly stuck to the windshield through the first glue layer, and other parts of the tag are fixed to the windshield through the low-viscosity mucilage glue of the isolating layer. In the actual application, since the bonding force between the isolating layer and the windshield is small, when the tag is dismantled, the tag structure located above the non-hollowed-out area of the isolating layer and the isolating layer are torn from the surface of the windshield jointly, and the INLAY structure, comprising the RFID chip, on the hollowed-out area is tightly attached to the surface of the windshield under the effect of the first glue layer, so that the RFID chip is separated from an antenna, and accordingly the anti-dismantling purpose is realized; meanwhile, since the larger-area antenna structure is torn along with the isolating layer and only the part (marked as the L area in FIGs) with the area equal to the area of the hollowed-out area is left on the windshield, replacement of the tag is facilitated, a smaller area of the first glue layer is left on the windshield, and the residual glue removal workload when the tag is replaced is reduced; on the contrary, in the first embodiment to the fourth embodiment, a large area of the first glue layer can be left on the windshield, and the first glue layer removal workload is large.

Specifically, in the fifth embodiment shown in FIG. 4a, the structure which is the same as that in the third embodiment is adopted by the INLAY 3 layer; in the sixth embodiment shown in FIG. 4b, the structure which is the same as that in the fourth embodiment is adopted by the INLAY layer 3. No matter what kind of structure is adopted, when the tag is torn, the L area in the FIGs can be left on the windshield under the effect of the first glue layer 1, so that the RFID chip 33 is left on the windshield and separated from the RFID antenna layer 32, and other areas are torn.

Furthermore, in the above embodiments, a protection layer 7 is further included, and the protection layer 7 is arranged on the side, away from the second glue layer 4, of the print layer 5.

It can be known from the above description that the protection layer can protect the print layer, so that the situation that characters, patterns and other information on the print layer become vague due to external factors and consequentially cannot be seen conveniently is prevented.

Furthermore, in the above embodiments, the protection layer 7 is made of PET or PE or PP.

It can be known from the above description that the protection layer can be transparent PET or PE or PP and is provided with a bottom glue layer.

Furthermore, in the above embodiments, a release film layer 8 is further included, and the release film layer 8 is arranged on the side, away from the IR/UV protective layers 2, of the first glue layer 1.

It can be known from the above description that the release film layer is arranged on the first glue layer and used for protecting the first glue layer, and when the RFID tag needs to be used, the release film layer is torn, and the first glue layer is stuck on the vehicle.

Furthermore, in the above embodiments, the print layer 5 is made of coated paper or PP or PET.

It can be known from the above description that the print layer can be white coated paper or PP or PET, and patterns are printed on a single side or both sides of the print layer, or bar codes are made on a single side or both sides of the print layer, or laser layers are hot-stamped on a single side or both sides of the print layer.

Furthermore, in the above embodiments, the INLAY layer 3 further comprises a conductive glue layer, and the conductive glue layer is arranged between the RFID chip 33 and the RFID antenna layer 32.

It can be known from the above description that the RFID chip is electrically connected with the RFID antenna layer through the conductive glue layer.

Furthermore, in the above embodiments, chip information of the RFID chip 33 is printed on the fragile layer 31.

It can be known from the above description that by printing the chip information of the RFID chip on the fragile layer, the chip information of the RFID chip can be compared according to the information on the fragile layer after being read through reading equipment, the information printed on the fragile layer can also be destroyed or deformed and even be replaced once the tag is destroyed, and in this way, the anti-counterfeit purpose can be realized by judging whether the structures such as the RFID chip and the print layer are destroyed and replaced or not.

Figure 3:
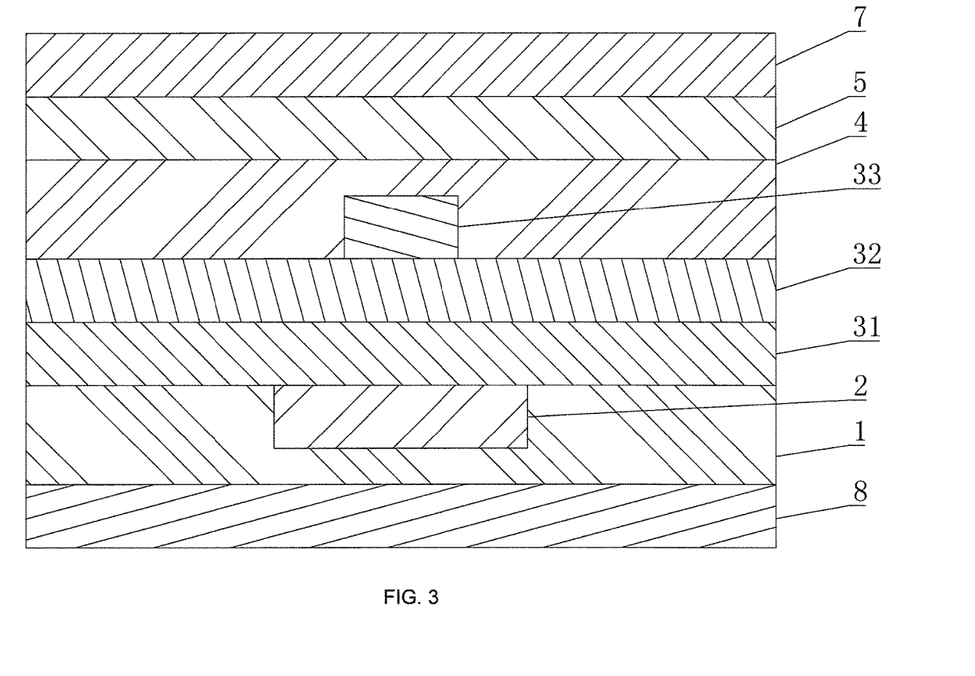
FIG. 3 is a sectional view of the vehicle RFID tag of the fourth embodiment of the utility model.

Please see FIG. 3, according to the fourth embodiment of the utility model:

A vehicle RFID tag is used for being stuck to the inner side of the front windshield of the vehicle. The vehicle RFID tag comprises a release film layer 8, a first glue layer 1, an IR/UV protective layer 2, an INLAY layer 3, a second glue layer 4, a print layer 5 and a protection layer 7, wherein the release film layer 8, the first glue layer 1, the IR/UV protective layer 2, the INLAY layer 3, the second glue layer 4, the print layer 5 and the protection layer 7 are sequentially arranged in a stacked mode. High-viscosity glue is adopted by the first glue layer 1, and the viscosity of the first glue layer 1 is larger than that of the second glue layer 4. The INLAY layer 3 comprises a fragile layer 31, an RFID antenna layer 32, an RFID chip 33 and a conductive glue layer; the fragile layer 31 is a resin film layer, and chip information of the RFID chip 33 is printed on the surface of a resin film for counterfeit preventing. The second glue layer 4 is connected with the RFID antenna layer 32 and wraps the RFID chip 33, the fragile layer 31 is connected with the first glue layer 1, the IR/UV protective layer 2 is arranged on the fragile layer 31 and located over the RFID chip 33, and meanwhile the area of the IR/UV protective layer 2 is larger than that of the RFID chip 33. The protection layer 7 is made of PET or PE or PP, and the print layer 5 is made of coated paper or PP or PET.

Figure 5A:
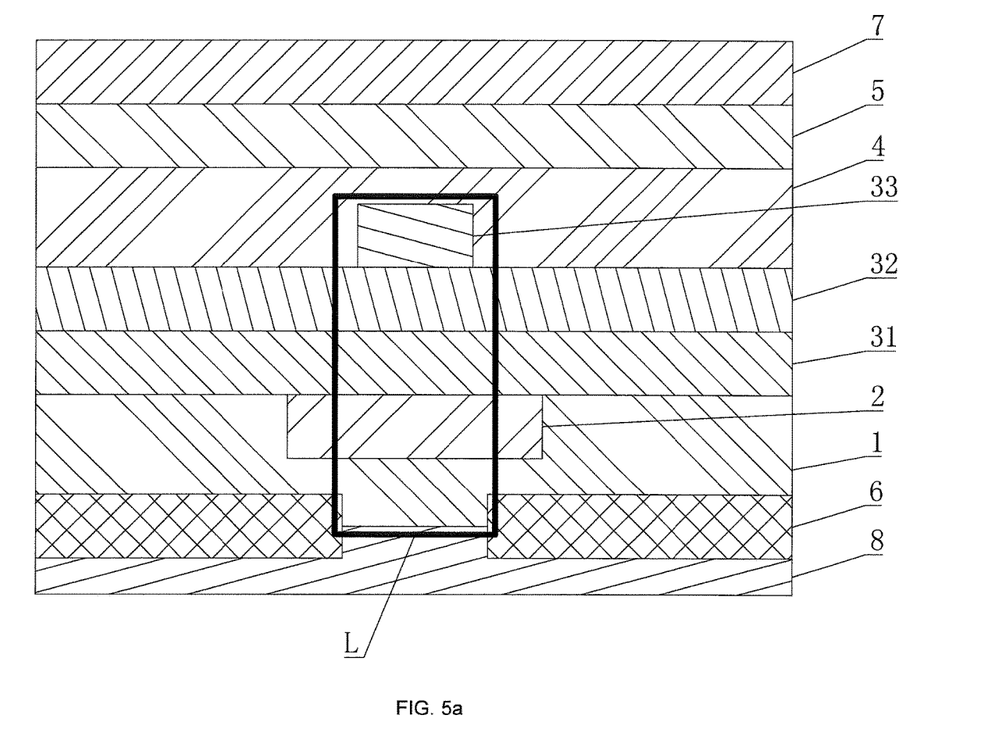
FIG. 5a is a sectional view of the vehicle RFID tag of the sixth embodiment of the utility model.
Figure 5B:
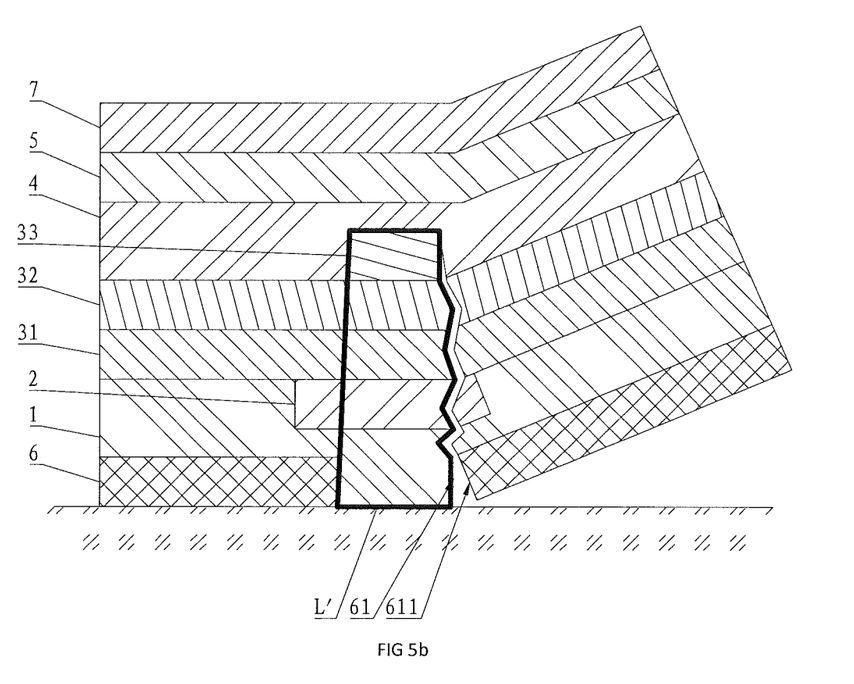
FIG. 5b is a schematic diagram of the sixth embodiment, which is torn and damaged from a single side in actual use, of the utility model.
Figure 5C:
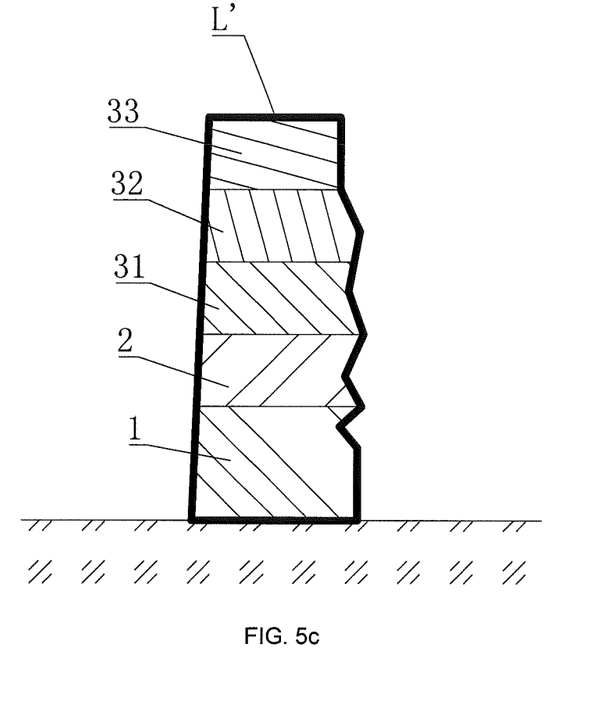
FIG. 5c is a schematic diagram of a residual part of the completely-torn sixth embodiment of the utility model.

Please see FIGS. 5a-5c, according to the sixth embodiment of the utility model:

A vehicle RFID tag of the sixth embodiment is different from the vehicle RFID tag in the fourth embodiment in that an isolating layer 6 is additionally arranged, and the isolating layer 6 is provided with a hollowed-out area 61. The isolating layer 6 is arranged between the first glue layer 1 and the release film layer 8; the side, connected with the release film layer 8, of the isolating layer 6 is coated with mucilage glue; the viscosity of the mucilage glue is smaller than that of the first glue layer 1; the arrangement position of the hollowed-out area 61 is matched with the position of the RFID chip 33; mucilage glue of the first glue layer 1 enters the hollowed-out area 61.

When the vehicle RFID chip is in use, the release film layer 8 is torn, the first glue layer 1 is stuck on the windshield through the hollowed-out area 61, and other parts are stuck to the windshield through the mucilage glue of the isolating layer 6; when the tag is torn, an L area (which comprises the whole RFID chip 33, part of the RFID antenna layer 32, part of the fragile layer 31, part of the IR/UV protective layer 2 and part of the first glue layer 1 and has the area relevant to the area of the hollowed-out area 61) in FIG. 5a is left on the windshield under the effect of the first glue layer 1, so that the RFID chip 33 is left on the windshield and separated from the RFID antenna layer 32, and other areas are torn.

The possible instantaneous state in the tearing process is shown in FIG. 5b: the tag is torn from the right side, a crack develops upwards along the edge 611 of the hollowed-out area, and at the moment, the L area develops into an L' area provided with an irregular edge. After tearing continues to be completed, the possible form of the structure left on the windshield is shown in FIG. 5c.

In conclusion, the vehicle RFID tag provided by the utility model has the advantages that the anti-dismantling function is achieved, the RFID chip can be protected against damage caused by ultraviolet rays and infrared rays, and the residual glue area is small.

What is claimed is:

1. A vehicle RFID tag, comprising a first glue layer, at least one IR/UV protective layers, an INLAY layer, a second glue layer and a print layer, the first glue layer, the INLAY layer, the second glue layer and the print layer are sequentially arranged in a stacked mode, the INLAY layer comprises a fragile layer, an RFID antenna layer and an RFID chip, the fragile layer, the RFID antenna layer and the RFID chip being separate layers which are sequentially arranged in a stacked mode, one of the IR/UV protective layers is between the first glue layer and the INLAY layer, or between the first glue layer and the INLAY layer and a second one of the IR/UV protection layers is between the second glue layer and the INLAY layer, the arrangement position of the at least one IR/UV protective layers is matched with the position of the RFID chip in the INLAY layer, the areas of the at least one IR/UV protective layer is larger than the area of the RFID chip, and the viscosity of the first glue layer is larger than that of the second glue layer.

2. The vehicle RFID tag according to the claim 1, wherein the first glue layer, the one IR/UV protective layers, the RFID chip, the RFID antenna layer, the fragile layer and the second glue layer are sequentially arranged in a stacked mode.

3. The vehicle RFID tag according to the claim 1, wherein the first glue layer, the one IR/UV protective layers, the fragile layer, the RFID antenna layer, the RFID chip and the second glue layer are sequentially arranged in a stacked mode.

4. The vehicle RFID tag according to the claim 1, further comprising an isolating layer, the isolating layer is provided with a hollowed-out area and arranged on the side, away from the INLAY layer, of the first glue layer, the side, away from the first glue layer, of the isolating layer is coated with mucilage glue, the viscosity of the mucilage glue is smaller than that of the first glue layer, and the arrangement position of the hollowed-out area is matched with the position of the RFID chip in the INLAY layer.

5. The vehicle RFID tag according to the claim 1, further comprising a protection layer, and the protection layer is arranged on the side, away from the second glue layer, of the print layer.

6. The vehicle RFID tag according to the claim 5, wherein the protection layer is made of PET or PE or PP.

7. The vehicle RFID tag according to the claim 1, further comprising a release film layer, and the release film layer is arranged on the side, away from the one IR/UV protective layers, of the first glue layer.

8. The vehicle RFID tag according to the claim 1, wherein the print layer is made of coated paper or PP or PET.

9. The vehicle RFID tag according to the claim 1, wherein the INLAY layer further comprises a conductive glue layer, and the conductive glue layer is arranged between the RFID chip and the RFID antenna layer.

10. The vehicle RFID tag according to the claim 1, wherein chip information of the RFID chip is printed on the fragile layer.

11. The vehicle RFID tag according to claim 1, wherein the one of the IR/UV protective layers is between the first glue layer and the INLAY layer and the second one of the IR/UV protection layers is between the second glue layer and the INLAY layer.

* * * * *